UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

CELLULOSE-ESTER COMPOSITION.

999,490.  Specification of Letters Patent.  Patented Aug. 1, 1911.

No Drawing.  Application filed November 9, 1907. Serial No. 401,515.

*To all whom it may concern:*

Be it known that I, CARLETON ELLIS, a citizen of the United States, and a resident of Larchmont, in the county of Westchester and State of New York, have invented certain new and useful Improvements in Cellulose-Ester Composition, of which the following is a specification.

This invention relates to cellulose ester compositions; and comprises a composition of matter adapted for plastic purposes and containing an ester of cellulose and the product of combination of chloral with an organic body containing hydroxyl groups; all as more fully hereinafter set forth and as claimed.

The esters of cellulose, such as the nitrate, stearate, oleate, benzoate, acetate, formate, and the like, resemble the original cellulose in many physical properties, and when colloided by suitable softeners or solvents may be employed to produce strong, tough and useful filaments, films and other plastic shapes. Nitrocellulose is the ester most generally employed at present. When treated with a suitable amount of camphor and heated, the two bodies commingle and unite, the camphor acting as a solvent or softener and producing a body which is freely plastic when hot, allowing it to be shaped to any desired form, and becomes hard when cold. This is the ordinary celluloid. Nitrocellulose being an explosive body and camphor being freely combustible, celluloid is a very inflammable body. In the present invention I replace the inflammable camphor either in whole or in part by new solvent or softening bodies which are less inflammable and possess other advantages for the present purposes.

I have discovered that by uniting chloral ($C_2HCl_3O$) with various complex organic bodies containing hydroxyl groups, that I obtain compositions which have a softening or solvent action on the nitrate and other esters of cellulose. These chloral derivatives are much less inflammable than camphor, wax and other bodies which have heretofore been used in celluloid compositions. Many hydroxylated organic bodies may be employed. The amyl ester of lactic acid is one which is suitable. Castor oil, which is a more or less indefinite mixture of bodies containing hydroxyl groups, when treated with chloral yields products which are particularly suitable for the present purposes. Ordinary castor oil may be mixed with about an equal weight of chloral, the mixture heated gently to produce the chloral derivative and any excess of chloral then removed by washing or distillation. This chloral derivative is then combined with the cellulose ester in, say, a proportion of 10 to 50 per cent. of the former to 90 to 50 per cent. of the latter. A suitable illustrative formula may comprise 60 per cent. of nitrocellulose, 20 per cent. of camphor and 20 per cent. of the castor oil chloral body formed by combining free chloral, and, preferably freshly made, chloral, with castor oil, using approximately equal parts for this purpose. Another illustrative formula may comprise 30 per cent. aforesaid castor oil chloral compound combined with 70 per cent. nitrocellulose. While in the present invention, I more particularly prefer to employ these chloral derivatives with nitrocellulose, yet other cellulose esters, such as stearate, oleate, benzoate, acetate, formate, etc., may be employed in its lieu.

In making a celluloid-like body from nitrocellulose, the chloral derivative may be employed in addition to the camphor ordinarily employed or it may replace such camphor altogether. The chloral derivative may also be employed with the ordinary camphor substitutes such as casein, naphthalene, etc., to such an extent as may be desired depending on the degree of hardness, or flexibility, or resiliency required. It is, of course, possible to introduce in the usual manner various fillers or coloring matter, such as talc, zinc white, oxid of iron, Prussian blue, wood flour, and similar material.

The combination or incorporation of the chloral derivative with the cellulose ester may be facilitated, if so desired, by the employment of suitable solvents, such as acetone, wood alcohol, denatured alcohol, or the acetonic or alcoholic mixtures derived as by-products from the refining of wood alcohol, such as the so-called "methyl acetone," and methyl-ethyl ketone.

I claim—

1. A celluloid-like plastic comprising a cellulose ester and a chloral derivative of an oily body.

2. A celluloid-like plastic comprising a nitrocellulose and a chloral derivative of an oily body.

3. A celluloid-like plastic comprising a cellulose ester and a combination of castor oil with chloral.

4. A celluloid-like plastic comprising a nitrocellulose and a combination of castor oil with chloral.

5. A celluloid-like composition consisting of substantially 70 per cent. nitrocellulose and 30 per cent. of a combination of castor oil with chloral.

6. A plastic composition comprising a cellulose ester and a compound of chloral with an organic acid derivative of an oily nature containing a hydroxyl group.

7. A plastic composition comprising a cellulose ester and a compound of chloral with a hydroxylated oily body.

8. A plastic composition comprising nitrocellulose and a compound of chloral with a hydroxylated oily body.

Signed at New York in the county of New York and State of New York this 21st day of October A. D. 1907.

CARLETON ELLIS.

Witnesses:
JAMES D. REMSEN,
NATHANIEL L. FOSTER.